Jan. 27, 1942.  W. BUSCHBECK ET AL  2,271,182
ARRANGEMENT FOR ELECTRICALLY COUPLING AN UNBALANCED LOAD WITH
A SYMMETRICAL VOLTAGE SOURCE OR VICE VERSA
Filed Aug. 31, 1940   3 Sheets-Sheet 1

INVENTORS
WERNER BUSCHBECK
HEINZ ZUMBUSCH
BY
ATTORNEY

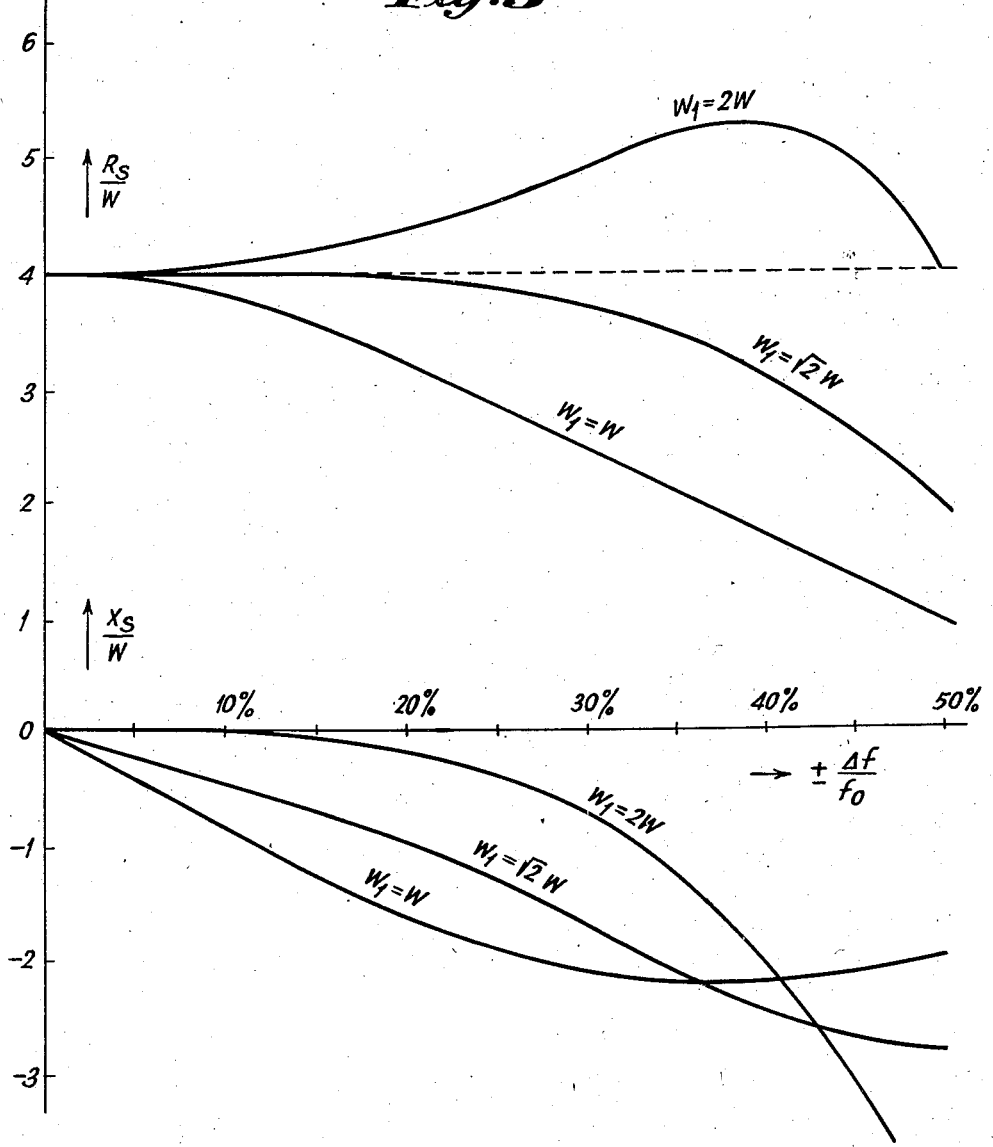

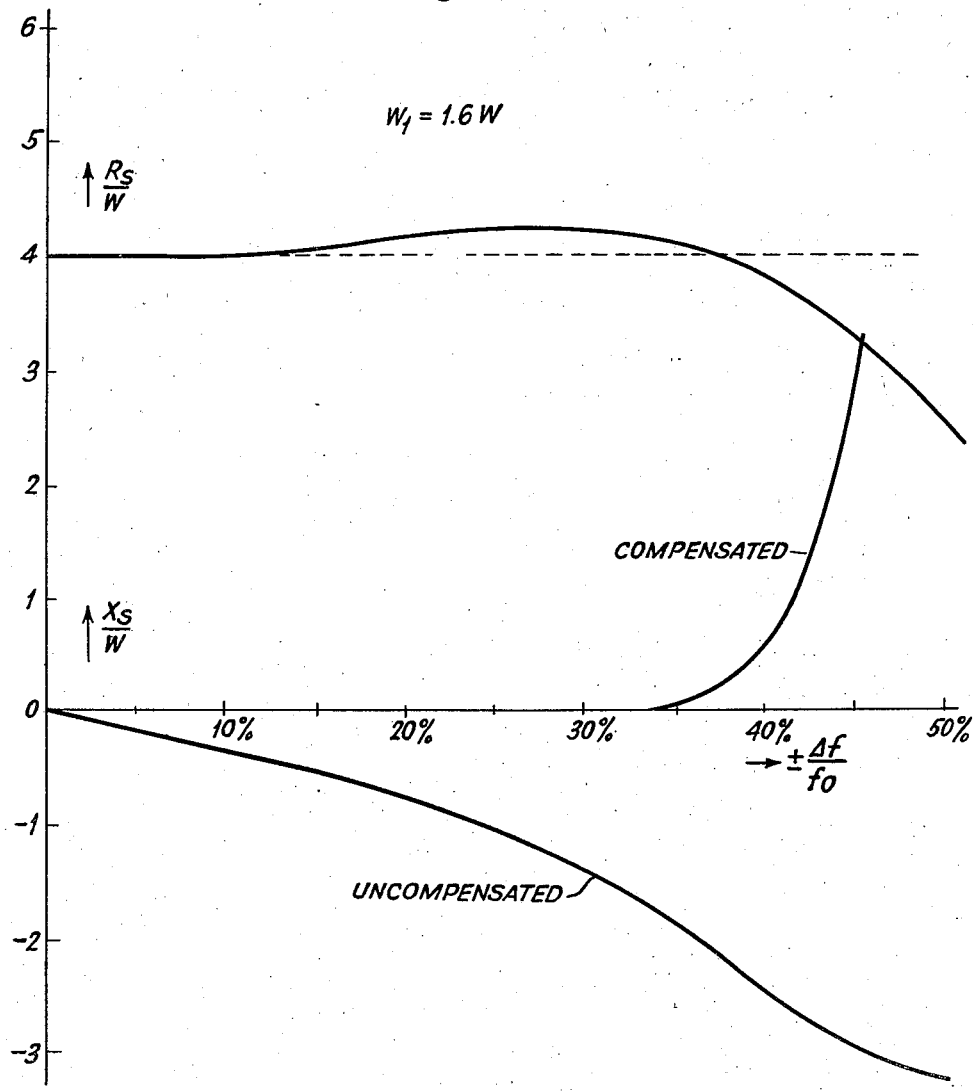

Patented Jan. 27, 1942

2,271,182

UNITED STATES PATENT OFFICE 2,271,182

ARRANGEMENT FOR ELECTRICALLY COUPLING AN UNBALANCED LOAD WITH A SYMMETRICAL VOLTAGE SOURCE OR VICE VERSA

Werner Buschbeck and Heinz Zumbusch, Berlin, Germany, assignors to Telefunken Gesellschaft für Drahtlose Telegraphie m. b. H., Berlin, Germany, a corporation of Germany Application August 31, 1940, Serial No. 354,936
In Germany July 20, 1939

7 Claims. (Cl. 178—44)

The present invention relates generally to high frequency transmission lines and more particularly to arrangements for coupling together a high frequency transmission line which is unsymmetrical with respect to ground potential to a high frequency transmission line which is symmetrical.

Figure 1:
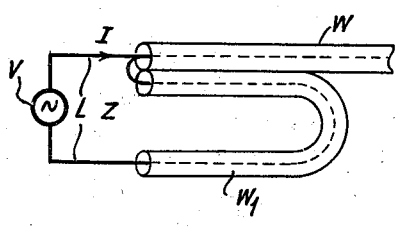

The invention will be described in detail with reference to the accompanying drawings. In the drawings Figures 1 and 2 are used to describe various features of the invention and Figures 1, 2, 3, and 4 are utilized to describe certain features of the invention and Figures 5, 6, 7, and 8 illustrate four modifications of the invention.

When a load being unbalanced with regard to earth is connected to a balanced voltage source or vice versa by means of a $\lambda/2$-by-pass line, this arrangement presents a pure resistive resultant impedance only at a single fixed frequency, while at other frequencies a complex impedance appears between the input terminals. This is shown in Fig. 1. V denotes a voltage source, which is balanced with regard to earth and is connected by a feeder L to a load. W is the unbalanced load and $W_1$ a by-pass line the electrical length of which is equal to $\lambda/2$, when $\lambda$ means the wave length of the high frequency voltage delivered by the voltage source. Z is the resultant impedance into which the voltage source V looks.

Figure 2:
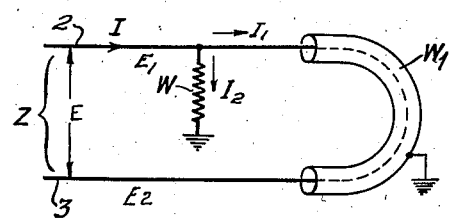

Assuming the feeder L itself being adequately matched by the surge impedance W, then the equivalent circuit diagram of Fig. 2 is true. The by-pass line may have the surge impedance $W_1$.
From Figure 2 it follows that:

(1) $\qquad E = E_1 - E_2$
(2) $\qquad I = I_1 + I_2$
(3) $\qquad E_1 = I_2 W$

The following transmission line equations are well known:

(4) $\qquad E_1 = E_2 \cos \alpha + jW_1 I \sin \alpha$ (5) $\qquad I_1 = I \cos \alpha + j\dfrac{E_2}{W_1} \sin \alpha$ By the use of Equations (1), (2), and (3), Equations (4) and (5) become:

(6) $\qquad E = E_2 (\cos \alpha - 1) + jW_1 I \sin \alpha$ (7) $\qquad E = IW(1 - \cos \alpha) - E_2 - jE_2\dfrac{W}{W_1} \sin \alpha$ Solving the Equation (6) for $E_2$ and putting this value into Equation (7):

(8)
$$E = IW(1-\cos \alpha) - \left(1 + j\dfrac{W}{W_1}\sin \alpha\right)\left(\dfrac{E - jW_1 \sin \alpha I}{\cos \alpha - 1}\right)$$

If
$$\dfrac{E}{I} = Z$$

then from Equation (8) we obtain:

(9) $\qquad Z = \dfrac{W(1-\cos \alpha) + \left(1+j\dfrac{W}{W_1}\sin \alpha\right)\left(\dfrac{jW_1 \sin \alpha}{\cos \alpha - 1}\right)}{1 + \dfrac{1 + j\dfrac{W}{W_1}\sin \alpha}{\cos \alpha - 1}}$ Simplifying Equation (9):

(10) $\qquad Z = \dfrac{-2W(1-\cos \alpha) + jW_1 \sin \alpha}{\cos \alpha + j\dfrac{W}{W_1}\sin \alpha}$ If the input impedance is denoted by
$$Z = R_s + jX_s$$

we find:

$$\dfrac{R_s}{W} = \dfrac{(\cos \alpha - 1)^2}{\cos^2 \alpha + \left(\dfrac{W}{W_1}\right)^2 \sin^2 \alpha}$$

$$\dfrac{X_s}{W} = \dfrac{W_1}{W} \cdot \sin \alpha \cdot \dfrac{\left[1 - 2\left(\dfrac{W}{W_1}\right)^2\right]\cos \alpha + 2\left(\dfrac{W}{W_1}\right)^2}{\cos^2 \alpha + \left(\dfrac{W}{W_1}\right)^2 \cdot \sin^2 \alpha}$$

$$\alpha = 2\pi\dfrac{l}{\lambda} = \pi\dfrac{\lambda_0}{\lambda}$$

In the last formula $l$ denotes the geometrical length of the by-pass line and $\lambda_0$ is the resonant wave length of it.

In Fig. 3,
$$\dfrac{R_s}{W}$$
and
$$\dfrac{X_s}{W}$$
is plotted against the relative frequency variation
$$\dfrac{\Delta_s}{f_0}$$
with
$$\dfrac{W_1}{W}$$
introduced as parameter. The following distinguished cases may be considered:

(1). $W_1=\sqrt{2}.W$.—In the neighbourhood of $\Delta f=0$ the variation of the resistive component takes its smallest value, while the reactive component increases rather rapidly.

(2). $W_1=2W$.—In the neighbourhood of $\Delta f=0$ the curve representing the variation of the reactive component exhibits its flattest course, while the resistive component suffers a greater variation.

If the arrangement should be capable of being used within a greater range of frequencies, care must be taken of the resistive component remaining practically constant and the reactive component being practically equal to zero both over the range in question. This may be attained in the following manner:

(1). $W_1$ is not made equal to $\sqrt{2}.W$ but is chosen equal to a value between $\sqrt{2}.W$ and $2W$. Thereby, the deviation of the resistance curve is indeed somewhat greater in the neighbourhood of the zero point but is, instead of it, relatively smaller within a greater range. Assuming $W_1=1.6W$, e. g., a maximal deviation of $\pm5\%$ is obtained within a range of $\Delta f$ of $\pm40\%$, as is seen from Fig. 4.

Figure 5:
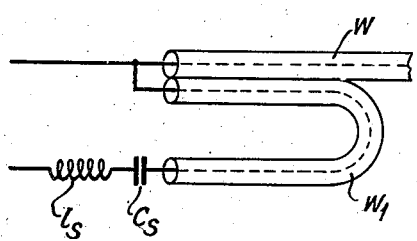

(2) If $W_1$ being chosen in this way the reactive component obtained exhibits a response opposite to that of a series-resonant circuit and, therefore, it may be compensated for by series connecting such a circuit or its equivalent, i. e. an open-ended $\lambda/4$-line or a short circuited $\lambda/2$-line. An arrangement of this kind is shown in Fig. 5. The series-resonant circuit comprises an inductance coil $l_s$ and a condenser $c_s$. As can be seen from Fig. 4, the reactive component may be caused to disappear up to a frequency deviation of 35% by means of a series-resonant circuit.

Figure 6:
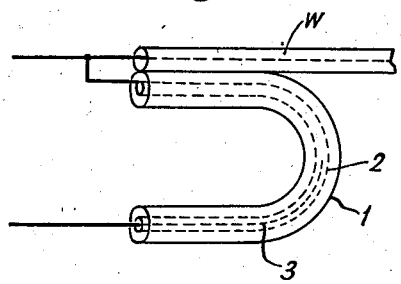
Figure 7:
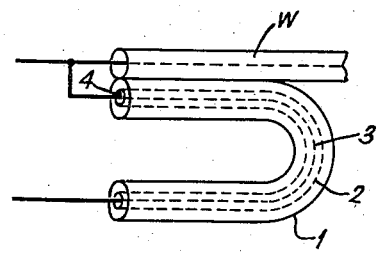

It is rather essential, that stray capacities are avoided at the compensating member. This may be attained in case of quasi-stationary members being used by placing the coils in the interior of grounded condensers. In case of lines being used the compensating lines may be placed in the interior of the by-pass line in such a way that the external lead of the compensating line represents the internal lead of the by-pass line. Arrangements of this kind are shown in Figs. 6 and 7. W is again the unsymmetrical load. The $\lambda/2$-by-pass line consists of coaxial tube conductors 1 and 2. The series-resonant circuit is formed by an open ended $\lambda/4$ line, the outer conductor of which is identical with the inner conductor 2 of the by-pass line, while the inner conductor 3 of the series-resonant circuit is surrounded by the conductor 2. It may be noted that the length of the innermost conductor 3 is only about half the length of the outer conductors. Fig. 7 illustrates the case of the series-resonant circuit being a $\lambda/2$-line, the one end of which is short-circuited by a wire 4. The meaning of the numerals 1, 2 and 3 respectively is the same as in Fig. 6. It should be noted that all coaxial conductors 1, 2, 3 are of the same length.

Figure 8:
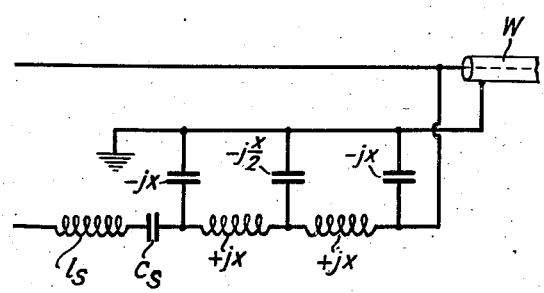

In the modifications shown in Figs. 1 to 7, the by-pass consists of a concentric conductor the electrical length of which is equal to $\lambda/2$. The bypass, however, may be also a quasi-stationary network including lumped inductances and capacities as shown in Fig. 8. The network consists for instance of two coils forming the series elements and three condensers forming the shunt elements. The elements are so to be dimensioned that the network is equivalent to a $\lambda/2$-line. The reactances of the coils are equal to $jx$ where $j=\sqrt{-1}$ and the reactances of the outer condensers equal to $-jx$, while the reactance of the central condenser is equal to $$-j\frac{x}{2}$$

We claim:

1. In a high frequency transmission system for operation over a wide range of frequencies, a balanced two-wire power line, a concentric power line, a connection from one side of the two-wire line to the inner conductor of the concentric line, an auxiliary concentric line having its inner conductor bridged across the two sides of the two-wire line, said auxiliary concentric line having an electrical length which is approximately an odd multiple of half a wave length at the mean operating frequency of said wide frequency range, the characteristic impedance of said auxiliary concentric line being in the neighborhood of sixty percent greater than the characteristic impedance of the concentric power line, and a reactive network series resonant at said means operating frequency in one of said lines adjacent its connection to the other of said lines, whereby the reactance of the other of said lines as viewed from said one of said lines is maintained small over said range.

2. In a high frequency transmission system for operation over a wide range of frequencies, a balanced two-wire power line, a concentric power line, a connection from one side of the two-wire power line to the inner conductor of the concentric power line, an auxiliary concentric line having its inner conductor connected between the other side of the two-wire line and the inner conductor of said concentric power line, said auxiliary concentric line having an electrical length which is approximately an odd multiple of half a wave length at the mean operating frequency of said transmission system, the characteristic impedance of said auxiliary concentric line being in the neighborhood of sixty percent greater than the characteristic impedance of the concentric power line, and a reactive network series resonant at substantially said mean operating frequency connected in one of said lines adjacent its connection to the other of said lines, whereby the reactance of said other of said lines as viewed from said one of said lines is maintained small over said frequency range.

3. In a high frequency transmission system, a balanced two-wire power line, a concentric power line, a connection from one side of the two-wire power line to the inner conductor of the concentric power line, a by-pass concentric line having one end of its inner conductor connected to the inner conductor of said concentric power line, said by-pass line having an electrical length which is approximately half a wave length at the operating frequency of said system and a characteristic impedance which is greater than the characteristic impedance of the concentric power line, and a reactive network series resonant at substantially the operating frequency connected between the other end of the inner conductor of said by-pass line and the other side of the two-wire line.

4. The arrangement described in the next preceding claim wherein the reactive network comprises an inductance coil and a condenser in series.

5. In a high frequency transmission system for operation over a wide frequency band, a balanced two-wire power line, a concentric power line, a connection from one side of the two-wire line to the inner conductor of the concentric line, an auxiliary concentric line having an inner conductor connected between the inner conductor of the concentric power line and the other side of the two-wire line, the connection to the other side of the two-wire line being made through reactive means series resonant at a frequency which is in the vicinity of the mean operating frequency of said band of frequencies, said auxiliary concentric line having an electrical length which is approximately an odd multiple of half a wave length at the mean operating frequency of said band of frequencies, the characteristic impedance of said auxiliary concentric line being greater than the characteristic impedance of the concentric power line.

6. In a high frequency transmission system for operation over a wide frequency range, a balanced two-wire power line, a concentric power line, a connection from one side of the two-wire power line to the inner conductor of the concentric power line, a by-pass line made up of two co-axial tubes one of which is within the other, said by-pass line having an electrical length which is approximately an odd multiple of half a wave length at the mean operating frequency of said frequency band and a characteristic impedance which is greater than the characteristic impedance of the concentric power line, one end of the inner tube of said auxiliary line being connected to the inner conductor of the concentric power line, a conductor having one end connected to the other side of the two-wire power line and its free end extending from the other end of said inner tube approximately half way therethrough.

7. In a high frequency transmission system for operation over a wide range of frequencies, a balanced two-wire power line, a concentric power line, a connection from one side of the two-wire power line to the inner conductor of the concentric power line, an auxiliary line made up of two co-axial tubes one of which is within the other and an inner conductor within the inner co-axial tube, said auxiliary line having an electrical length which is approximately an odd multiple of half a wave length at the mean operating frequency of said range, conductor means connecting one end of the inner conductor of the auxiliary line, the corresponding end of the inner tube of the auxiliary line and the inner conductor of the concentric power line, and a connection between the other end of the inner conductor of the auxiliary line and the other side of the two-wire power line.

WERNER BUSCHBECK.
HEINZ ZUMBUSCH.